United States Patent
Park et al.

(10) Patent No.: US 12,010,767 B2
(45) Date of Patent: Jun. 11, 2024

(54) GLASS PLATE HAVING A HEAT GENERATING FUNCTION AND A MANUFACTURING METHOD FOR THE SAME

(71) Applicants: HYUNDAI MOTOR COMPANY, Seoul (KR); KIA MOTORS CORPORATION, Seoul (KR); KCC Glass Corporation, Seoul (KR)

(72) Inventors: Jong Min Park, Seoul (KR); Nak Kyoung Kong, Seongnam-si (KR); Jang Suk Hong, Sejong-si (KR); Chan Hee Park, Cheonan-si (KR); Yong Jin Kong, Cheonan-si (KR)

(73) Assignees: HYUNDAI MOTOR COMPANY, Seoul (KR); KIA MOTORS CORPORATION, Seoul (KR); KCC Glass Corporation, Seoul (KR)

( * ) Notice: Subject to any disclaimer, the term of this patent is extended or adjusted under 35 U.S.C. 154(b) by 584 days.

(21) Appl. No.: 17/184,227

(22) Filed: Feb. 24, 2021

(65) Prior Publication Data

US 2021/0329746 A1  Oct. 21, 2021

(30) Foreign Application Priority Data

Apr. 20, 2020 (KR) .......................... 10-2020-0047678

(51) Int. Cl.
*H05B 3/86* (2006.01)
*B32B 17/10* (2006.01)
(Continued)

(52) U.S. Cl.
CPC .......... *H05B 3/86* (2013.01); *B32B 17/10036* (2013.01); *B32B 17/10385* (2013.01);
(Continued)

(58) Field of Classification Search
CPC ... H05B 3/86; H05B 3/06; H05B 3/74; H05B 3/14; H05B 2203/013; H05B 2203/016;
(Continued)

(56) References Cited

U.S. PATENT DOCUMENTS 3,772,075 A * 11/1973 Tarnopol ............. C03C 17/3649
427/404
9,900,932 B2 2/2018 Degen et al.
10,091,840 B2 10/2018 Kagaya et al.
10,348,011 B2 7/2019 Reul et al.
(Continued)

FOREIGN PATENT DOCUMENTS

JP 6319102 B2 5/2018
KR 20130112907 A 10/2013
(Continued)

OTHER PUBLICATIONS

Korean Office Action cited in corresponding Korean patent application No. 10-2020-0047678; Feb. 5, 2021; 8pp.

*Primary Examiner* — Shawntina T Fuqua
(74) *Attorney, Agent, or Firm* — Lempia Summerfield Katz LLC

(57) ABSTRACT

A glass plate according to the present disclosure includes: a coated area and an uncoated area; a heating layer that is coated on the coated area and includes a conductive material generating heat by receiving power; and two bus bars that extend along an extension direction, that are electrically connected to the heating layer to supply the power to the heating layer, and that are spaced apart from each other along a reference direction orthogonal to the extension direction. The uncoated area includes a plurality of uncoated lines having a length along the reference direction and formed as a single line bent at least once. The plurality of uncoated lines is disposed to be spaced apart along the extension direction.

9 Claims, 11 Drawing Sheets

(51) Int. Cl.
*H05B 3/06* (2006.01)
*B60J 1/00* (2006.01)

(52) U.S. Cl.
CPC .. *B32B 17/10761* (2013.01); *B32B 17/10779* (2013.01); *B32B 17/10871* (2013.01); *H05B 3/06* (2013.01); *B60J 1/001* (2013.01); *B60J 1/002* (2013.01); *H05B 2203/013* (2013.01); *H05B 2203/016* (2013.01); *H05B 2203/017* (2013.01)

(58) Field of Classification Search
CPC ........ H05B 2203/017; B32B 17/10036; B32B 17/10385; B32B 17/10761; B32B 17/10779; B32B 27/06; B60J 1/001; B60J 1/002; C03C 27/10
See application file for complete search history.

(56) References Cited

U.S. PATENT DOCUMENTS

| | | | |
|---|---|---|---|
| 10,638,549 | B2 | 4/2020 | Weber et al. |
| 2004/0200821 | A1* | 10/2004 | Voeltzel .......... H05B 3/86 |
| | | | 219/203 |
| 2005/0145968 | A1* | 7/2005 | Goela .......... G02B 5/00 |
| | | | 438/72 |
| 2013/0277352 | A1 | 10/2013 | Degen et al. |
| 2015/0244089 | A1 | 8/2015 | Reul et al. |
| 2015/0319808 | A1 | 11/2015 | Kagaya et al. |
| 2017/0034875 | A1 | 2/2017 | Weber et al. |

FOREIGN PATENT DOCUMENTS

| | | |
|---|---|---|
| KR | 20150036256 A | 4/2015 |
| KR | 101979986 B1 | 5/2019 |

\* cited by examiner

| SHAPE | | | | | |
|---|---|---|---|---|---|
| | OPENING RATE:100% | OPENING RATE:24% | OPENING RATE:21.3% | OPENING RATE:15.5% | OPENING RATE:22.5% |
| HEATING TENDENCY (1-Layer) | SEVERE TEMPERATURE DEVIATION MAXIMUM:64.9°C INNER:18.9°C DIFFERENCE:46.0°C | SEVERE TEMPERATURE DEVIATION MAXIMUM:65.6°C INNER:19.1°C DIFFERENCE:46.5°C | GOOD TEMPERATURE DEVIATION MAXIMUM:41.7°C INNER:41.4°C DIFFERENCE:0.3°C | TEMPERATURE DEVIATION OCCURS MAXIMUM:45.0°C INNER:33.7°C DIFFERENCE:11.3°C | TEMPERATURE DEVIATION OCCURS MAXIMUM:42.0°C INNER:38.4°C DIFFERENCE:3.6°C |
| HIGH PASS RESPONSE (LESS THAN 250ms) | PASS (1256ms) | PASS (1256ms) | PASS (1256ms) | PASS (1256ms) | PASS (1256ms) |
| ELECTROMAGNETIC WAVE LOSS (UNAPPLIED16.2-24.4dB) | GREAT (0.3-0.8dB) | GREAT (0.1-02.dB) | GOOD (6.1-7.3dB) | GOOD (5.1-5.3dB) | GOOD (2.3-5.8dB) |
| RADIO WAVE REFLECTION (LESS THAN 2dB) | PASS (1.4dB) | PASS (1.3dB) | PASS (1.6-1.8dB) | PASS (1.6-1.7dB) | PASS (1.3-1.9dB) |

FIG.6

| | |
|---|---|
| SHAPE | <br>OPENING RATE:100% |
| HEATING TENDENCY<br>(1-Layer) | <br>SEVERE TEMPERATURE DEVIATION<br>MAXIMUM:64.9℃<br>INNER:18.9℃<br>DIFFERENCE:46.0℃ |
| HIGH PASS RESPONSE<br>(LESS THAN 250ms) | PASS<br>(1256ms) |
| ELECTROMAGNETIC WAVE LOSS<br>(UNAPPLIED16.2~24.4dB) | GREAT<br>(0.3~0.8dB) |
| RADIO WAVE REFLECTION<br>(LESS THAN 2dB) | PASS<br>(1.4dB) |

FIG.6A

| | |
|---|---|
| SHAPE | <br>OPENING RATE: 24% |
| HEATING TENDENCY<br>(1-Layer) | <br>SEVERE TEMPERATURE DEVIATION<br>MAXIMUM: 65.6°C<br>INNER: 19.1°C<br>DIFFERENCE: 46.5°C |
| HIGH PASS RESPONSE<br>(LESS THAN 250ms) | PASS<br>(1256ms) |
| ELECTROMAGNETIC WAVE LOSS<br>(UNAPPLIED 16.2~24.4dB) | GREAT<br>(0.1~02.dB) |
| RADIO WAVE REFLECTION<br>(LESS THAN 2dB) | PASS<br>(1.3dB) |

| | |
|---|---|
| SHAPE | <br>OPENING RATE:21.3% |
| HEATING TENDENCY<br>(1-Layer) | <br>GOOD TEMPERATURE DEVIATION<br>MAXIMUM:41.7°C<br>INNER:41.4°C<br>DIFFERENCE:0.3°C |
| HIGH PASS RESPONSE<br>(LESS THAN 250ms) | PASS<br>(1256ms) |
| ELECTROMAGNETIC WAVE LOSS<br>(UNAPPLIED16.2~24.4dB) | GOOD<br>(6.1~7.3dB) |
| RADIO WAVE REFLECTION<br>(LESS THAN 2dB) | PASS<br>(1.6~1.8dB) |

| | |
|---|---|
| SHAPE | <br>OPENING RATE: 15.5% |
| HEATING TENDENCY<br>(1-Layer) | <br>TEMPERATURE DEVIATION OCCURS<br>MAXIMUM: 45.0°C<br>INNER: 33.7°C<br>DIFFERENCE: 11.3°C |
| HIGH PASS RESPONSE<br>(LESS THAN 250ms) | PASS<br>(1256ms) |
| ELECTROMAGNETIC WAVE LOSS<br>(UNAPPLIED 16.2~24.4dB) | GOOD<br>(5.1~5.3dB) |
| RADIO WAVE REFLECTION<br>(LESS THAN 2dB) | PASS<br>(1.6~1.7dB) |

| | |
|---|---|
| SHAPE | <br>OPENING RATE:22.5% |
| HEATING TENDENCY<br>(1-Layer) | <br>TEMPERATURE DEVIATION OCCURS<br>MAXIMUM:42.0℃<br>INNER:38.4℃<br>DIFFERENCE:3.6℃ |
| HIGH PASS RESPONSE<br>(LESS THAN 250ms) | PASS<br>(1256ms) |
| ELECTROMAGNETIC WAVE LOSS<br>(UNAPPLIED16.2~24.4dB) | GOOD<br>(2.3~5.8dB) |
| RADIO WAVE REFLECTION<br>(LESS THAN 2dB) | PASS<br>(1.3~1.9dB) |

GLASS PLATE HAVING A HEAT GENERATING FUNCTION AND A MANUFACTURING METHOD FOR THE SAME

CROSS-REFERENCE TO RELATED APPLICATION

This application claims the benefit of priority to Korean Patent Application No. 10-2020-0047678, filed in the Korean Intellectual Property Office on Apr. 20, 2020, the entire contents of which are incorporated herein by reference.

TECHNICAL FIELD

The present disclosure relates to a glass plate having a heating function and a method of manufacturing the same.

BACKGROUND

In a vehicle, a central visual field should not have a substantial visual limitation according to legal regulations. However, the visual field of a front glass and a rear glass of a vehicle may be limited by a temperature difference inside and outside the vehicle, by rain, by snow, or the like. In a case of a conventional vehicle equipped with an internal combustion engine, a method may be used of securing the visual field of the front glass by circulating heat generated by operation of the internal combustion engine. Alternatively, a glass plate having a heating layer may be used as the front glass. By heat generated by the heating layer, condensed moisture, ice, and snow may be removed in a short time.

The glass plate having the heating function may be formed by stacking a metal layer and a glass layer. The heat may be generated by applying power to the metal layer to perform heating. However, when the metal layer is used, electromagnetic waves may be blocked. Therefore, utilization of an advanced driver assistance system (ADAS) in the vehicle may be hindered by the glass plate.

In addition, when the glass plate is formed to generate heat using the metal layer, a heating amount is concentrated in some areas, which generates stress due to local heating. This may thereby cause damage to the glass plate and negatively affecting adhesion required for bonding the glass plate.

SUMMARY

The present disclosure has been made to solve the above-mentioned problems occurring in the prior art while advantages achieved by the prior art are maintained intact.

An aspect of the present disclosure provides a glass plate, which reduces loss of electromagnetic waves and has a heating function. Another aspect of the present disclosure provides a method of manufacturing such a glass plate.

The technical problems to be solved by the present inventive concept are not limited to the aforementioned problems. Any other technical problems not mentioned herein should be clearly understood from the following description by those having ordinary skill in the art to which the present disclosure pertains.

According to an aspect of the present disclosure, a glass plate includes: a glass layer that includes a coated area and an uncoated area; a heating layer that is coated on the coated area and includes a conductive material generating heat by receiving power; and two bus bars that extend along an extension direction, that are electrically connected to the heating layer to supply the power to the heating layer, and that are spaced apart from each other along a reference direction orthogonal to the extension direction. The uncoated area includes a plurality of uncoated lines having a length along the reference direction and formed as a single line bent at least once. The plurality of uncoated lines is disposed to be spaced apart along the extension direction.

According to an aspect of the present disclosure, a glass plate includes: a glass layer that includes a coated area and an uncoated area; a heating layer that is coated on the coated area and includes a conductive material generating heat by receiving power; and two bus bars that extend along an extension direction, that are electrically connected to the heating layer to supply the power to the heating layer, and that are spaced apart from each other along a reference direction orthogonal to the extension direction. The uncoated area includes a plurality of uncoated lines, each of which has a length with respect to the reference direction, is continuously connected, and does not surround and divide the coated area. The plurality of uncoated lines is disposed to be spaced apart along the extension direction.

According to an aspect of the present disclosure, a method of manufacturing a glass plate includes: coating a heating layer on a coated area of a first glass layer including the coated area and uncoated area to form a plurality of uncoated lines formed of a single line bent at least once; arranging bus bars to be in contact with the heating layer; sequentially stacking a thermoplastic polymer layer and a second glass layer on the heating layer; and bonding the stacked layers by pressing and heating.

BRIEF DESCRIPTION OF THE DRAWINGS

The above and other objects, features, and advantages of the present disclosure will be more apparent from the following detailed description taken in conjunction with the accompanying drawings:

FIGS. 6A-6E are tables illustrating heating tendency and loss of electromagnetic waves according to embodiments of the present disclosure.

DETAILED DESCRIPTION

Figure 1:
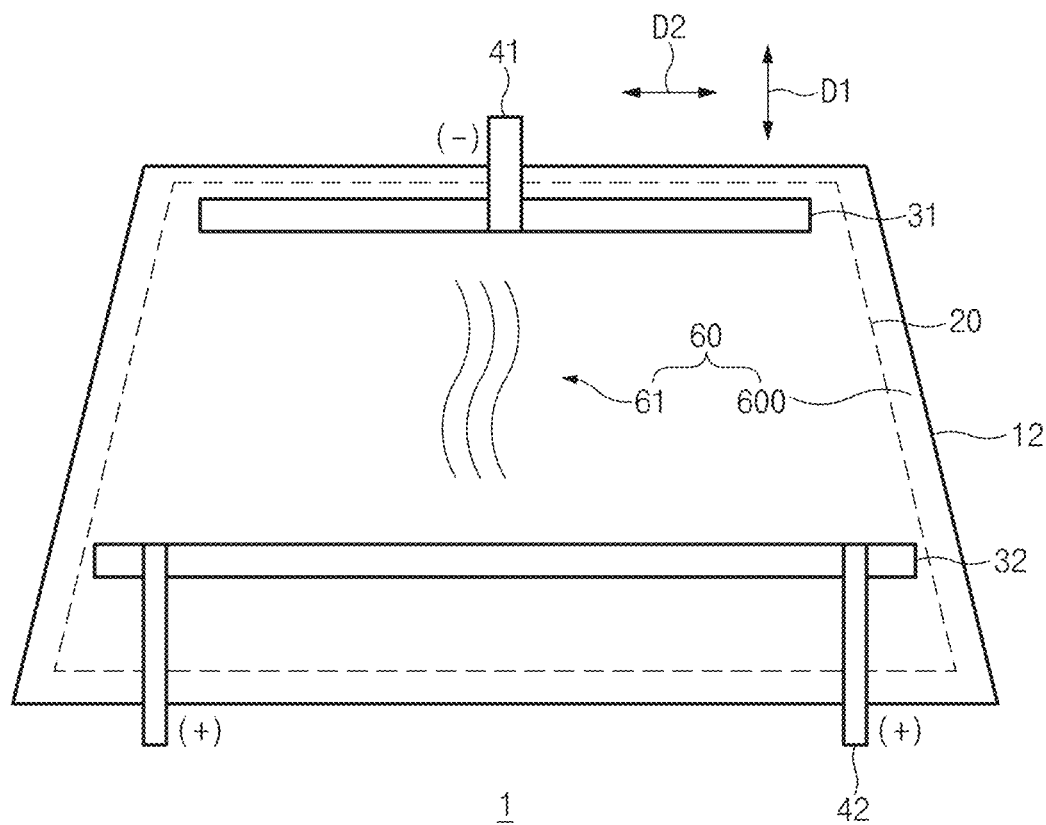
FIG. 1 is a view illustrating a situation in which a first glass layer is removed from a glass plate according to an embodiment of the present disclosure.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions has been omitted in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component. The terms do not limit the nature, sequence or order of the constituent components. When a component is described as being "connected", "combined", or "coupled" with another component, it should be understood that the component may be connected or coupled to another component directly or with another component interposing therebetween.

Figure 2:
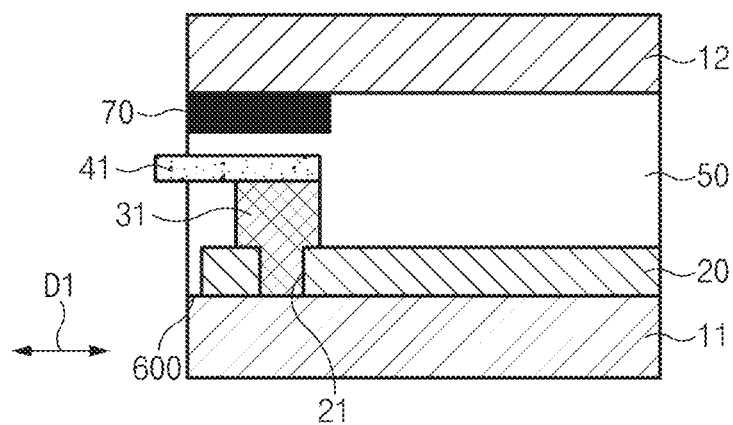
FIG. 2 is a view illustrating a glass plate having a stacked structure according to an embodiment of the present disclosure.

FIG. 1 is a view illustrating a situation in which a first glass layer 11 is removed from a glass plate "1" according to an embodiment of the present disclosure. FIG. 2 is a view illustrating the glass plate "1" having a stacked structure according to an embodiment of the present disclosure.

Referring to the drawings, the glass plate "1" according to an embodiment of the present disclosure includes glass layers 11 and 12, a heating layer 20, and bus bars 31 and 32. Herein, a reference direction D1 and an extension direction D2 are arbitrary directions orthogonal to each other.

Glass Layers 11 and 12

The glass layers 11 and 12 are layers made of a glass material, and the transparent glass layers 11 and 12 are sufficient to be capable of transmitting visible light. The glass layers 11 and 12 may have the first glass layer 11 and the second glass layer 12. However, other layers may be stacked between the first glass layer 11 and the second glass layer 12.

For example, a thermoplastic polymer layer 50 may be disposed between the first glass layer 11 and the second glass layer 12 to bond other layers such as the glass layers 11 and 12. The thermoplastic polymer layer 50 may be made of a thermoplastic polymer including at least one of polyvinyl butyral (PVB), ethylene-vinyl acetate (EVA), and polyethylene terephthalate (PET). The thermoplastic polymer layer 50 may be formed of one film or a plurality of films.

Further, an opaque layer 70 formed of an opaque material may be disposed between the first glass layer 11 and the second glass layer 12. The opaque layer 70 may cover the bus bars 31 and 32 from the outside. The opaque layer 70 may be formed on the second glass layer 12 positioned on a facing side of the first glass layer 11 on which the heating layer 20 is formed. The opaque layer 70 may be formed through sintering after being disposed through a screen printing method.

The glass layers 11 and 12 may be formed to include float glass, quartz glass, borosilicate glass, soda lime glass, transparent plastic, polycarbonate, polyamide, polyester, polyvinyl chloride, or other polymer mixtures.

The glass layers 11 and 12 may be primarily made of flat glass and secondarily manufactured of a glass of a three-dimensional shape having a curvature to be used as a glass in the front or rear of a vehicle.

The glass layers 11 and 12 include a coated area and an uncoated area 60. The heating layer 20, which is described below, is stacked on the coated area, and the heating layer 20 is not stacked on the uncoated area 60. Therefore, heating is not performed through the uncoated area 60, but electromagnetic waves may pass through the uncoated area 60. The coated area is an area on the first glass layer 11 on which the heating layer 20 is stacked, and thus it is not shown separately.

Bus Bars 31 and 32

The bus bars 31 and 32 are in contact with and electrically connected to the heating layer 20 to supply power to the heating layer 20. The bus bars 31 and 32 may be disposed inside the glass plate "1" and may be electrically connected to a power supply device through terminals 41 and 42 that are capable of being provided as ribbon terminals. The bus bars 31 and 32 may be soldered using lead-free solder or conductive tape to be electrically connected to each part.

The bus bars 31 and 32 may include at least two bus bars. In the present disclosure, the first bus bar 31 and the second bus bar 32 are spaced apart from each other along the reference direction D1. However, the number of bus bars 31 and 32 may be larger than two and the number of terminals 41 and 42 may also correspond to the number of bus bars 31 and 32. The first bus bar 31 may be connected to a cathode of a power supply device through the first terminal 41 and the second bus bar 32 may be connected to an anode of the power supply device through the second terminal 42. Accordingly, electrons may flow along the heating layer 20 through the first bus bar 31 and be discharged through the second bus bar 32. As the current flows in the heating layer 20, an amount of heat due to ohmic heating may be generated.

The first bus bar 31 and the second bus bar 32 may extend along the extension direction D2 and may be spaced apart along the reference direction D1. The first bus bar 31 and the second bus bar 32 may have different lengths with respect to the extension direction D2. In an embodiment of the present disclosure, it is described that the first bus bar 31 is formed shorter than the second bus bar 32. The length of the first bus bar 31 may be twice as large as a separation distance that separates the first bus bar 31 and the second bus bar 32 from each other in the reference direction D1. Due to the arrangement and length of the bus bars 31 and 32, a path through which electrons spread from the heating layer 20 may be uniformly distributed to evenly perform heating.

When each of the bus bars 31 and 32 is viewed along the reference direction D1, a length of each of the bus bars 31 and 32 along a thickness direction, which are orthogonal to the reference direction D1 and extension direction D2, may be called a width. Widths of both ends of each of the first bus bar 31 and the second bus bar 32, based on the extension direction D2, may be ⅓ or more and ⅔ or less than a width of a center of each of the first bus bar 31 and the second bus bar 32. A shape of each of the bus bars 31 and 32 may prevent occurrence of local overheating at corners of the heating layer 20 adjacent to both ends of each of the bus bars 31 and 32.

Some areas of the heating layer 20 may be removed through laser etching to form bus bar insertion parts 21, which allow the bus bars 31 and 32, to be inserted, to be in contact with the heating layer 20. Each of the bus bar insertion parts 21 may be formed as a recessed groove or in a form of a through hole. By forming the bus bar insertion parts 21, a surface area in which the heating layer 20 and the bus bars 31 and 32 are in contact with each other may be increased, and electrons may be smoothly moved.

Coated Area and Heating Layer 20

The heating layer 20 is a layer including a conductive material that is coated on the coated area and generates heat by receiving power. In an embodiment of the present disclosure, it may be described that metal is used as a representative example of the conductive material, but other materials may be used.

The heating layer 20 may have a surface or sheet resistance of 0.5 to 10 ohm/sq. The heating layer 20 may be stacked on the first glass layer 11 along a thickness direction by a chemical vapor deposition (CVD) or a plasma enhanced CVD (PECVD) method.

The heating layer 20 may be a layer in which two or more different layers are stacked. By stacking a plurality of layers, a refractive index of the heating layer 20 may be adjusted. In detail, the heating layer 20 may include a conductive metal layer, a dielectric layer, an antireflection layer, and a non-conductive inorganic material layer to prevent scratching.

The conductive metal layer may be made of a material selected from Ag, Au, Cu, and/or combinations thereof. The conductive metal layer may be composed of a plurality of such layers or materials. Current may be applied to each of the plurality of conductive metal layers to generate heat, and the coated glass plate "1" may be heated by the generated heat. As ohmic resistance is inversely proportional to a cross-sectional area of a conducting wire, configuring the plurality of conductive metal layers, each of which has a relatively narrow cross-sectional area, rather than configuring one conductive metal layer with a relatively wide cross-sectional area, may be a way to increase heating performance.

The dielectric layer may be made of a dielectric material such as nitride or aluminum oxide.

The coated area on which the heating layer 20 is coated may be disposed over the entire glass layers 11 and 12 but may not be disposed at edges of the glass layers 11 and 12. The edges may be a circumferential region 600 included in the uncoated area 60 on which the heating layer 20 is not coated. In other words, the circumferential region 600 may surround the coated area. The circumferential region 600 may play a role of preventing the heating layer 20 from being corroded due to oxidation from an external atmosphere.

Uncoated Line 61

The uncoated area 60 may include the circumferential region 600 described above and a plurality of uncoated lines 61. The plurality of uncoated lines 61 may be disposed to be spaced apart along the extension direction D2. The uncoated lines 61 may have a length along the reference direction D1. However, the uncoated lines 61 may be formed in a continuously connected form and formed as a single line bent at least once, or may be formed in a shape including a main stem and a branch extending from the stem.

The uncoated lines 61 are connected continuously as if drawing a continuous line for a time without removing a brush, but do not surround and divide the coated area. Accordingly, a portion of the heating layer 20 that is isolated and through which no current is transmitted may disappear. In addition, when the uncoated line 61 completely encloses a portion of the coated area, overheating may occur at a boundary, but the uncoated line 61 may be configured in an open type in the present disclosure to prevent overheating.

A total area of the uncoated line 61 may be formed to be greater than 15% and less than 25% of the coated area. The uncoated line 61 may have the same area as described above. Thus, it is possible to allow an appropriate degree of transmission of current without seriously impairing heating performance of the heating layer 20. In addition, heat may be evenly distributed without being concentrated in some areas.

In detail, each of the uncoated lines 61 according to an embodiment of the present disclosure may have a wave shape such as a sine wave, as shown in FIG. 1. In addition, each of the uncoated lines may be formed in a spiral shape.

Figure 3:
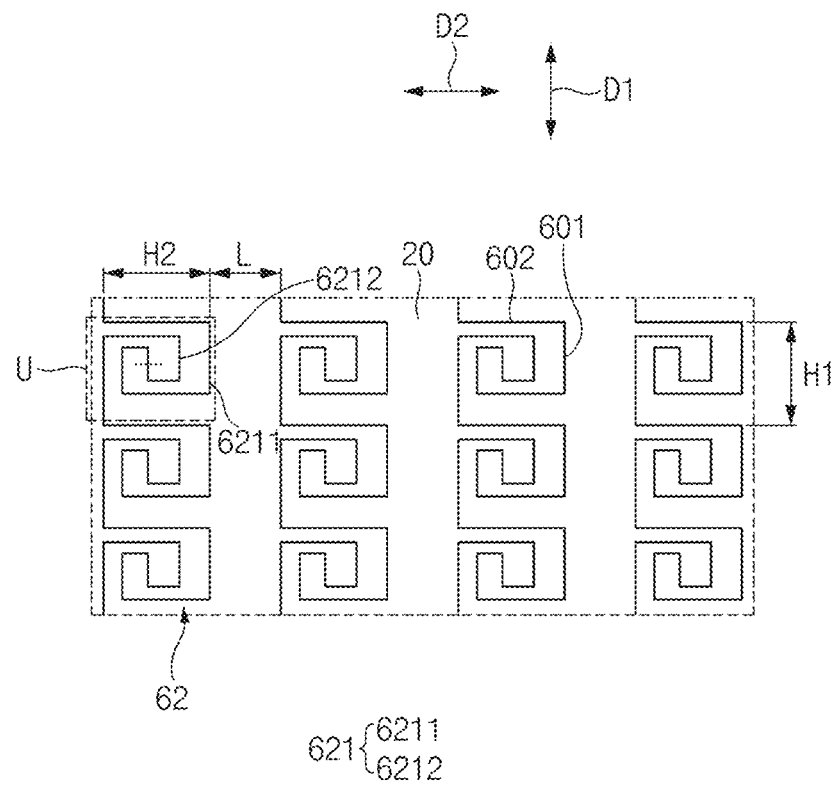
FIG. 3 is a view illustrating an uncoated line of a glass plate according to a modified example of an embodiment of the present disclosure.

FIG. 3 is a view illustrating an uncoated line 62 of a glass plate "1" according to a modified example of an embodiment of the present disclosure.

The uncoated line 62 may include a plurality of uncoated patterns 621 that are disposed to be spaced apart along the reference direction D1 and connected to each other. The uncoated patterns 621 may be continuously arranged. Thus, the uncoated patterns 621 may be formed to include a plurality of reference lines 601 extending along the reference direction D1 and a plurality of extension lines 602 extending along the extension direction D2. Accordingly, each of the uncoated patterns 621 may include, for example, a portion formed in an 'S' shape.

In FIG. 3, a portion located inside an area 'U' indicated by a dashed-dotted line is one of the uncoated patterns 621. The uncoated pattern 621 of the uncoated line 62 according to a modified example of the embodiment of the present disclosure may include two twisting patterns 6211 and 6212. The first twisting pattern 6211 and the second twisting pattern 6212 may be twisted clockwise from two sites spaced apart from each other toward a center of the uncoated pattern 621 and connected to each other at the center. The two twisting patterns 6211 and 6212 may be twisted counterclockwise toward the center and connected to each other at the center.

Each of the twisting patterns 6211 and 6212 may be formed in a form that includes the plurality of extension lines 602 and the plurality of reference lines 601 and vertically bent and curled as shown in FIG. 3, or may be formed in a form of a continuously curved curve. Alternatively, each of the twisting patterns 6211 and 6212 may include the vertically bent and curled part and the continuously curved curve.

A length of the uncoated pattern 621 along the reference direction D1 may be referred to as a reference length H1 and a length of the uncoated pattern 621 along the extension direction D2 may be referred to as an extension length H2. Each of the reference length H1 and the extension length H2 of the uncoated pattern 621 may be formed in a range of more than 1 mm and less than 3 mm. In addition, a distance L in which the uncoated lines 62 are separated from each other along the extension direction D2 may be greater than 0.4 mm and less than 30 mm.

The same twisting patterns 6211 and 6212 may be spaced apart along the reference direction D1 by a specific distance. In other words, the first twisting patterns 6211 may be spaced apart from each other by a specific distance, or the second twisting patterns 6212 may be spaced apart from each other by a different specific distance. The distance between the same twisted patterns 6211 and 6212 may be ¼ or more and ½ or less of a length of the single uncoated pattern 621 along the reference direction D1.

The uncoated pattern 621 is illustrated as having an arrangement of a 3×4 matrix in FIG. 3 but is not limited thereto. In an example, the uncoated pattern 621 may have an arrangement of a 50×50 matrix.

Figure 4:
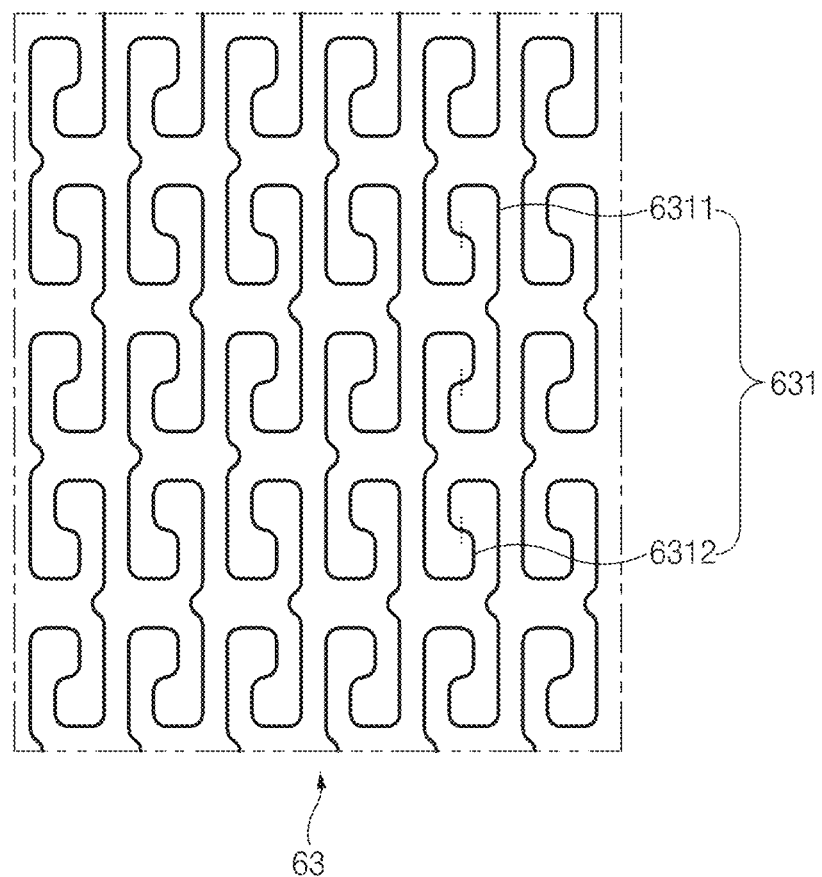
FIG. 4 is a view illustrating an uncoated line of a glass plate according to another modified example of an embodiment of the present disclosure.
Figure 5:
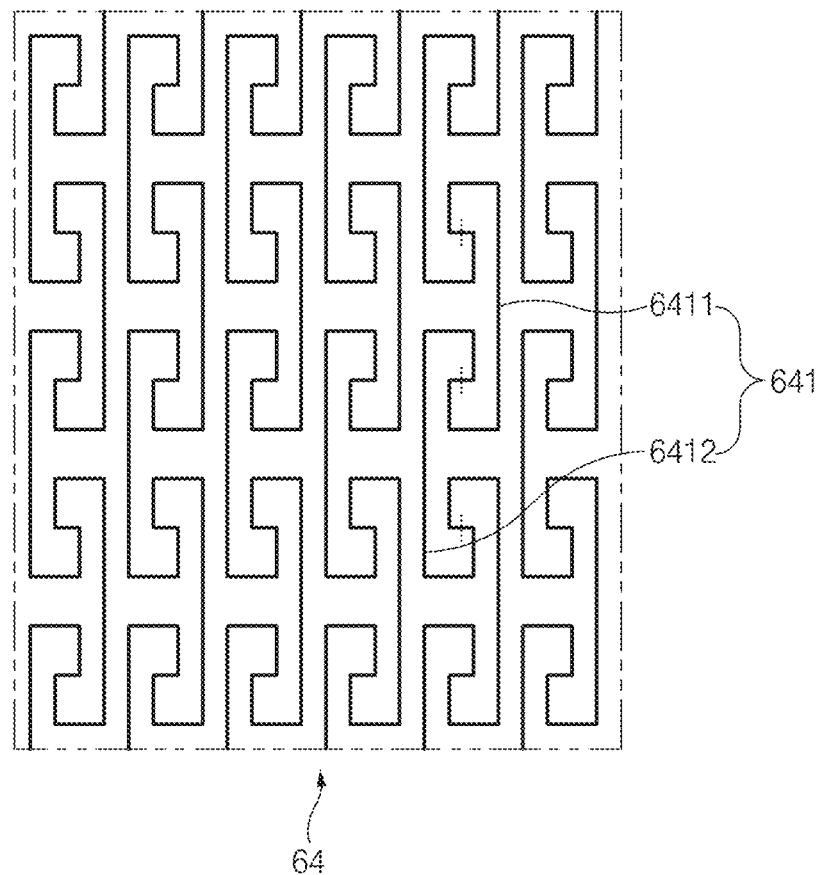
FIG. 5 is a view illustrating an uncoated line of a glass plate according to still another modified example of an embodiment of the present disclosure.

FIG. 4 is a view illustrating an uncoated line "63" of the glass plate "1" according to another modified example of an embodiment of the present disclosure. FIG. 5 is a view illustrating an uncoated line "64" of the glass plate "1" according to still another modified example of an embodiment of the present disclosure.

Referring to the drawings, the uncoated lines 63 and 64 of the glass plate "1" according to these modified examples of embodiments of the present disclosure include certain uncoated patterns 631 and 641, respectively. The uncoated pattern 631 according to the modified example of FIG. 4 may include a first partial pattern 6311 and a second partial pattern 6312. The first partial pattern 6311 and the second partial pattern 6312 may be alternately arranged and connected to form the entire uncoated line 63. The uncoated pattern 641 according to the modified example of FIG. 5 may include a third partial pattern 6411 and a fourth partial pattern 6412. The third partial pattern 6411 and the fourth partial pattern 6412 may be alternately arranged and connected to form the entire uncoated line 64.

The first partial pattern 6311 and the second partial pattern 6312 in FIG. 4 may be symmetrical to each other about a straight line drawn along the reference direction D1. The third partial pattern 6411 and the fourth partial pattern 6412 in FIG. 5 may also be symmetrical to each other about a straight line drawn along the reference direction D1. However, the partial patterns 6311, 6312, 6411, and 6412 may be arranged slightly different from one another in the reference direction D1 and the extension direction D2 and may be alternately arranged and connected to form the entire uncoated lines 63 and 64, respectively.

Each of the first partial pattern to the fourth partial pattern 6311, 6312, 6411, and 6412 may have an overall 'C' shape. Both ends thereof may be rolled inwardly and each of the first partial pattern to the fourth partial pattern 6311, 6312, 6411, and 6412 may have a shape open toward one side. Each of the partial patterns 6311, 6312, 6411, and 6412 may have a shape that is rolled in a clockwise or counterclockwise direction as a whole. The first partial pattern 6311 and the second partial pattern 6312 may have corners, in comparison to the third partial pattern 6411 and the fourth partial pattern 6412, that are rounded and may have a modified shape in which a center of a line extending longest along the reference direction D1 is recessed.

FIGS. 6A-6E are tables illustrating heating tendency and loss of electromagnetic waves according to embodiments of the present disclosure.

Figure 6B:
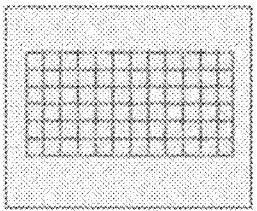
Figure 6B:
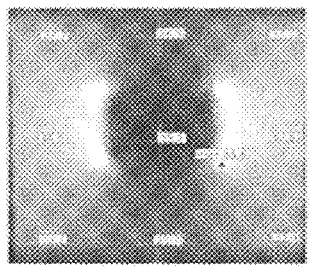
Figure 6C:
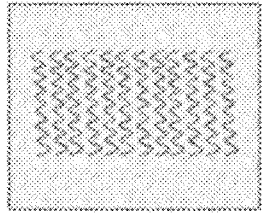
Figure 6C:
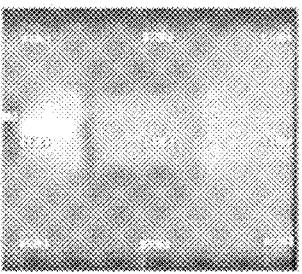
Figure 6D:
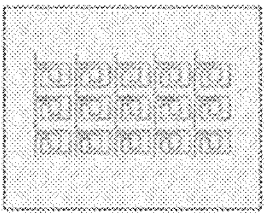
Figure 6D:
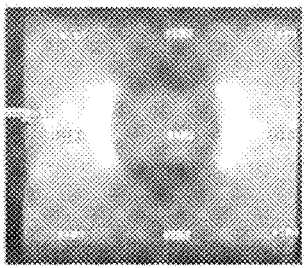
Figure 6E:
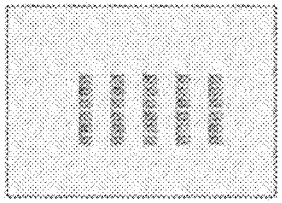
Figure 6E:
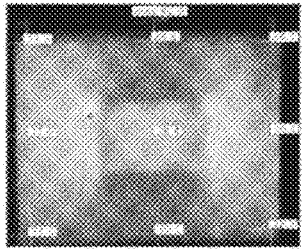

The tables in FIGS. 6A-6E include various numbers obtained when an area of the uncoated area corresponds, for example, to 100% of an area of the coated area in a first table in FIG. 6A and when an area of the uncoated area corresponds to 24% of the area of the coated area in a second table in FIG. 6B. The tables in FIGS. 6A-6E also include uncoated lines of types that are possible by embodiments of the present disclosure and values obtained for the above uncoated lines in the tables in FIGS. 6C, 6D, and 6E. The table in FIG. 6C relates to when the uncoated line is formed in a wave form and the tables in FIGS. 6D and 6E relate to a case having the uncoated pattern of FIG. 3. Also, a distance between the uncoated lines in the table in FIG. 6E is greater than a distance between the uncoated lines in the table in FIG. 6D.

Referring to the data, it may be seen that, for electromagnetic wave loss, the uncoated area formed according to the embodiments of the present disclosure does not reach the same level as the example cases but shows a sufficiently usable level. Further, in temperature deviation, the uncoated area formed according to the embodiments of the present disclosure has much better performance than the example cases.

For manufacturing the glass plate "1" according to an embodiment of the present disclosure, the following process may be performed. The heating layer 20 may be coated on the coated area of the first glass layer 11 including the coated area and the uncoated area 60 to form the plurality of uncoated lines 61.

Then, the bus bars 31 and 32 may be prepared and disposed on the heating layer 20 to be in contact with the heating layer 20. Before the bus bars 31 and 32 are in contact with the heating layer 20, the bus bar insertion part 21 may be formed in the heating layer 20 through a laser etching process.

The thermoplastic polymer layer 50 and the second glass layer 12 may be sequentially arranged on the heating layer 20. After the arrangement is finished, the stacked layers are bonded by pressing and heating to form the glass plate "1" having a heating function.

Forming the heating layer 20 may include printing and sintering a metal paste through a screen printing method or an inkjet roll-to-roll (R2R) method.

After the heating layer 20 is formed, the glass layers 11 and 12 may be processed at a temperature of 500° C. to 700° C. in order to have a curvature. For the heating layer 20, electrical heat treatment may be performed at a temperature of 200° C. to 400° C. for 1 minute to 5 minutes to change resistivity.

Stacking the thermoplastic polymer layer 50 and the second glass layer 12 and bonding the thermoplastic polymer layer 50 and the second glass layer 12 through pressurization/heating may be carried out using an autoclave method, and as an example, at 10 to 15 bar and 100° C. to 150° C. Also, for example, the process may be carried out under conditions of 0.7 to 1 bar and 100° C. to 120° C. through a method such as a vacuum bag and a ring.

Accordingly, the glass plate having the heating function may reduce the loss of the electromagnetic waves.

The heating amount of the glass plate having the heating function may be not concentrated in some areas, which reduces the stress occurrence due to the local heating, thereby improving the durability of the glass plate.

Although all components of the embodiments of the present disclosure have been described as being combined in a single unit or operated in combination with each other, the present disclosure is not limited to the embodiments. In other words, one or more of all components may be selectively combined to operate within the scope of the present disclosure. Further, the terms "comprise", "include", "have", and the like, when used in this specification, mean that the components can exist unless specifically stated otherwise, and that they should be construed as being able to further include other components. Unless otherwise defined, all terms including technical and scientific terms used herein have the same meaning as commonly understood by one of ordinary skill in the art to which the present disclosure belongs. It should be further understood that terms, such as those defined in commonly used dictionaries, should be interpreted as having a meaning that is consistent with their meaning in the context of the relevant art and the present disclosure. Such terms should not be interpreted in an idealized or overly formal sense unless expressly so defined herein.

The above description merely explains the spirit of the present disclosure. The present disclosure may be changed and modified in various ways without departing from the spirit of the present disclosure by those of ordinary skill in the art. Accordingly, the embodiments described herein are provided, not to limit, but merely to explain the spirit of the present disclosure. The spirit of the present disclosure is not limited by the embodiments. The patent right of the present disclosure should be construed by the following claims and the scope and spirit of the disclosure should be construed as being included in the patent right of the present disclosure.

What is claimed is:

1. A glass plate comprising:
   a glass layer configured to include a coated area and an uncoated area;

a heating layer configured to be coated on the coated area and to include a conductive material generating heat by receiving power; and two bus bars configured to extend along an extension direction, to be electrically connected to the heating layer to supply the power to the heating layer, and to be spaced apart from each other along a reference direction orthogonal to the extension direction, wherein the uncoated area includes a plurality of uncoated lines having a length along the reference direction and formed as a single line bent at least once, wherein the plurality of uncoated lines is disposed to be spaced apart along the extension direction, wherein each of the plurality of uncoated lines includes a plurality of uncoated patterns disposed to be spaced apart along the reference direction and connected to each other, and wherein each of the plurality of uncoated patterns is formed to include a plurality of reference lines extending along the reference direction and a plurality of extension lines extending along the extension direction and is formed as a single continuous line that is bent.

2. The glass plate of claim 1, wherein each of the uncoated patterns includes a portion formed in an 'S' shape.

3. The glass plate of claim 1, wherein each of the uncoated patterns includes two twisting patterns that are twisted in a clockwise or counterclockwise direction from two sites spaced apart from each other with respect to the reference direction toward a center, respectively, and are connected to each other at the center.

4. The glass plate of claim 1, wherein the plurality of uncoated lines had an area greater than 15% and less than 25% of the coated area.

5. The glass plate of claim 1, wherein a shorter one of the two bus bars has a length with respect to the extension direction, which is twice as large as a separation distance of the two bus bars separated along the reference direction.

6. The glass plate of claim 1, wherein the uncoated area includes a circumferential region surrounding the coated area.

7. The glass plate of claim 1, wherein each of the uncoated lines is formed in a spiral shape.

8. A glass plate comprising:
a glass layer configured to include a coated area and an uncoated area;
a heating layer configured to be coated on the coated area and to include a conductive material generating heat by receiving power; and two bus bars configured to extend along an extension direction, to be electrically connected to the heating layer to supply the power to the heating layer, and to be spaced apart from each other along a reference direction orthogonal to the extension direction, wherein the uncoated area includes a plurality of uncoated lines each of which has a length with respect to the reference direction, is continuously connected, and does not surround and divide the coated area, wherein the plurality of uncoated lines is disposed to be spaced apart along the extension direction, wherein each of the plurality of uncoated lines includes a plurality of uncoated patterns disposed to be spaced apart along the reference direction and connected to each other, and wherein each of the plurality of uncoated patterns is formed to include a plurality of reference lines extending along the reference direction and a plurality of extension lines extending along the extension direction and is formed as a single continuous line bent at least once.

9. A method of manufacturing a glass plate comprising:
coating a heating layer on a coated area of a first glass layer including the coated area and the uncoated area to form a plurality of uncoated lines formed of a single line bent at least once;

arranging bus bars to be in contact with the heating layer;

sequentially stacking a thermoplastic polymer layer and a second glass layer on the heating layer; and bonding the stacked layers by pressing and heating, wherein each of the plurality of uncoated lines includes a plurality of uncoated patterns disposed to be spaced apart along the reference direction and connected to each other, and wherein each of the plurality of uncoated patterns is formed to include a plurality of reference lines extending along the reference direction and a plurality of extension lines extending along the extension direction and is formed as a single continuous line bent at least once.

* * * * *